United States Patent Office 3,555,078
Patented Jan. 12, 1971

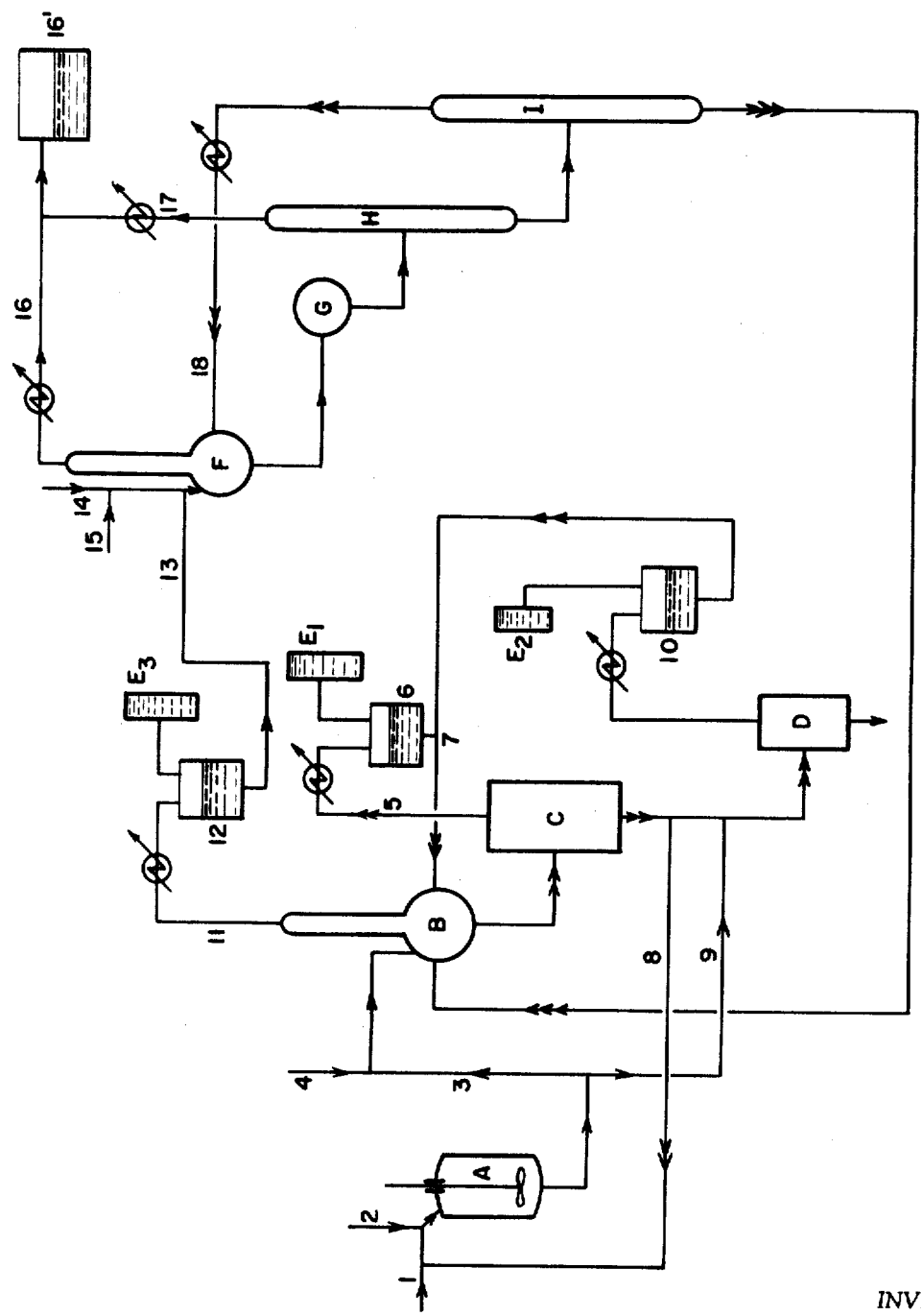

3,555,078
PROCESS OF MANUFACTURING ALIPHATIC ESTERS
Louis Amiet and Jean-Claude Soula, Lyon, France, assignors to Progil, Paris, France, a corporation of France
Continuation-in-part of application Ser. No. 583,538, Oct. 3, 1966. This application Aug. 22, 1969, Ser. No. 859,239
Int. Cl. C07c 67/02
U.S. Cl. 260—491                    7 Claims

ABSTRACT OF THE DISCLOSURE

A process for manufacturing aliphatic esters, such as ethyl acetate, essentially free of impurities and at a high conversion rate and yield is provided. The process involves absorbing an olefin under pressure in sulfuric acid; reacting the absorbate with monochloro acetic acid; separating the alkyl monochloracetate from the reaction mixture under reduced pressure; submitting the ester to an acidolysis utilizing a suitable carboxylic acid in excess; and separating the final ester by distillation with recycling of the organic reagents and sulfuric acid.

---

This is a continuing application in part of Ser. No. 583,538, filed Oct. 3, 1966, now abandoned.

The present invention relates to a process of manufacturing aliphatic esters, especially ethyl acetate, and more particularly to a method for the continuous preparation of these esters, by the reaction of an olefin and an organic acid with the intermediate formation of the corresponding ester of monochloracetic acid.

The production of aliphatic esters by direct reaction of an olefin with an acid, in the presence of a catalyst such as phosphoric acid, fluoro-boric acids, etc. is known. Another generally used process consists in absorbing the olefin in sulfuric acid in order to form sulfuric esters, and then in reacting the desired organic acid with the absorbate in order to obtain the desired ester and to regenerate the sulfuric acid. This process, however, has many disadvantages. The conversion rates and yields are low; the operating conditions are difficult and involve the formation of by-products, especially of olefinic polymers which are present during the entire process. Moreover the obtained ester often contains impurities, which are difficult to separate. In order to improve the yield, it has been suggested that an excess of the stoichiometric amount of organic acid be employed. In this case however, it is necessary to recover the unreacted acid in order to make the process economical and to utilize recycling of sulfuric acid in the olefin absorption system. Indeed it has been noted that the speed of hydrocarbon absorption quickly decreases when the organic acid ratio increases in the absorption liquid. The complete separation of organic acid and sulfuric acid is extremely difficult and requires the application of drastic operating conditions which are prejudicial to the stability of the present compounds.

The present invention obviates these disadvantages. It permits working with an excess of organic acid, suitable for a high conversion rate and yield, separately recovering the organic acid and sulfuric acid, and recycling of both which increases the value of the process. Moreover the present invention provides very pure aliphatic esters free of impurities to be obtained.

It is also known to manufacture aliphatic acid esters by reacting an olefin with monochloracetic acid in the presence of sulfuric acid whereby a monochloracetic acid ester is formed and subjecting this monochloracetic acid ester to treatment with an aliphatic acid in order to obtain an ester of said aliphatic acid. But according to this known process, olefin, sulfuric acid and monochloracetic acid are all contacted together in a single step. If a gaseous olefin were to be so reacted, it would be necessary to introduce this olefin into the mixture of monochloracetic and sulfuric acids; this, however, would give poor results because the high percentage of monochloracetic acid in the mixture would greatly reduce the olefin absorption speed. Moreover, according to this process, an aqueous sulfuric acid of high water content—for example an aqueous 80% sulfuric acid—is employed, so that, in the case of a gaseous olefin, particularly ethylene, the process could not be effectively carried out, because, with such a water content in sulfric acid, the olefin absorption would be practically inhibited.

The present invention obviates these disadvantages, since the olefin is first introduced into sulfuric acid and then the absorption product is reacted with monochloracetic acid, and a sulfuric acid of low water content is employed. This results in a rapid and a high olefin absorption, resulting in very good yields.

In its most general form the process according to the present invention involves absorbing an olefin under pressure, in sulfuric acid; in then reacting the absorbate with monochloracetic acid; then separating under reduced pressure, the alkyl monochloracetate from the reaction mixture; submitting this ester to an acidolysis utilizing a suitable carboxylic acid in excess; and finally separating the final ester by distillation, the organic reagents and sulfuric acid being wholly or partly recycled.

More particularly, it is preferred that the process comprise:

(1) Absorbing a gaseous olefinic hydrocarbon having 2 to 4 carbon atoms in sulfuric acid having a concentration of at least 98% under 5 to 50 bars at 40–120° C.;

(2) Reacting the absorbate with monochloracetic acid in excess of the stoichiometry and separating the resultant alkyl monochloracetate from the reaction mixture under reduced pressure;

(3) Vaporizing the residual liquid from the monochloracetate formation step in order to remove at least part of the unreacted monochloracetic acid, condensing the vaporisate and recycling it to said monochloracetate formation step;

(4) Submitting said alkylmonochloracetate to an acidolysis step by reacting it with an excess of an aliphatic acid having the formula R—COOH, in which R is an alkyl radical of from 1 to 3 carbon atoms, at 125–155° C., under atmospheric pressure in the presence of sulfuric acid, and separating the final ester by distillation; and (5) Distilling the residual liquid from said acidoylsis step whereby unreacted aliphatic acid is removed and is recycled to said acidolysis step and the tailings thereof are recycled to the monochloracetate formation step.

The process of the present invention can be applied to the linear or branched olefins, especially those having two to four carbon atoms and to the aliphatic acids having the formula, R—COOH in which R is an alkyl radical having one to three carbon atoms. Of course, according to the olefin used there is obtained a linear or branched alkyl ester. For example, ethylene and acetic acid give ethyl acetate, while propylene and butylene form with this acid respectively, isopropyl acetate and isobutyl acetate.

In the manufacturing process according to the invention, it is recommended one use raw materials having a low water content in order to avoid the formation of light by-products such as alcohols and ethers. However, during the acidolysis phase, a water content of between 500 and 1000 parts per million is especially advantageous to obtain a convenient reaction rate. When the water content of the reactants exceeds this ratio, it may be brought back to the indicated value by the addition of a dehydrating agent such as sulfuric or acetic anhydride.

Olefin absorption is effected in an autoclave, under a pressure of 5 to 50 bars at a temperature of 40 to 120° C., with a contact time of from 20 to 60 minutes. In order to allow as close contact as possible between the gas and liquid it is recommended that strong stirring be employed. The sulfuric acid used must be strongly concentrated, its concentration, preferably, being greater than 98%. The proportion of the absorbed olefin varies with the concentration and according to whether the sulfuric acid is fresh or recycled. It is generally between 0.6 and 1.1 mole for 100 gm. of absorbate, in the case of ethylene.

According to a feature of the invention, monochloracetic acid in excess is added to the absorbate to form the corresponding ester. The reaction takes place by heating under reduced pressure. The molar ratio between the acid and olefin contained in the absorbate is always greater than 1; it is chosen in such a way so that the boiling point of the reaction mixture permits the direct distillation of the monochloracetic ester. For example when monochloracetic acid and ethylene adsorption product are present, it is better to react 1.05 to 3, preferably 2.5 moles of monochloracetic acid for each mole of olefin. A pressure of 10 to 40 mm. Hg must be maintained in the reactor and the contact time may vary between 15 and 45 minutes. The reaction temperature, which depends upon the boiling point of the mixture under applied vacuum, may vary over a large range, but an upper limit must be maintained in order to avoid the degradation of the compounds present in the mixture. For example, in the case of the reaction between monochloracetic acid and ethylene absorbate, a temperature of 110° C., under a pressure of 20 mm. Hg, is satisfactory.

The reaction liquid, after separation by distillation of the greatest part of the formed monochloracetate, is subjected to a flash vaporization, under reduced pressure, preferably 8 to 20 mm. at a temperature higher than in the previous operating phase, for example 140 to 170° C., in order to separate the remaining ester and the unreacted acid, which are recycled after condensation, into the esterification reactor. The major part of the residue of this vaporization is sent into the olefin absorption system. The non-recycled part, after mixture with a proper ratio of olefinic absorbate is sent into a second vaporizer, working at the same pressure as the previous apparatus, but at a temperature from 10 to 30° C. higher. This operation is to recover the monochloracetic acid present in this fraction.

The monochloracetate issuing from the distillation of the first operating phase, has a purity generaly greater than 99.5%. The unreacted monochloracetic acid which is possibly present therein does not affect the following steps of this process. The light impurities such as alcohols and ethers may be retained in coolers or low temperature traps. If it is desired to obtain an ester completely free from alcohols and ethers, it is possible to separate these quite easily, according to conventional means, such as by distillation.

After this possible purification, the monochloracetate is mixed with an excess of a suitable organic acid, corresponding to the final desired ester, in the presence of sulfuric acid as a catalyst. The molar ratio of organic acid/monochloracetic ester is between 1.1 and 3.5. The most favorable quantity of sulfuric acid is about 12 to 25% by weight, with respect to the introduced monochloracetate. The water content, in the mixture submitted to acidolysis, is maintained preferably at 500 to 1000 parts per million. The mixture is caused to boil, and is then maintained at a temperature yielding a sufficient reaction rate, preferably between 125 and 155° C. although a temperature greater than this may be applied. It is chosen, as is the pressure, in such a way that the greatest part of the formed ester is separated by distillation. The average contact time varies generally between 45 and 80 minutes.

The residual liquid from the acidolysis, after passing to a second reactor, in which the reaction continues for about 30 to 60 minutes, is subjected to distillation under reduced pressure, preferably 100 to 350 mm. Hg, in order to separate the ester formed in the second reactor. The residue is subjected to an additional distillation step under reduced pressure, for example 55 to 80 mm. Hg, in which the excess of organic acid introduced in the acidolysis reaction is entirely recovered, with the unreacted monochloracetate. These products are recycled to the acidolysis reactor, while the remaining liquid, containing only monochloracetic and sulfuric acids, is sent back to the monochloracetate formation zone.

The raw ester thus obtained contains only a low quantity of carboxylic acid easily separable by conventional means, such as rectification. The amount of alcohol present in the ester is easily maintained at less than 0.1%.

The process described hereinabove may be conducted either in a continuous or in a discontinuous manner for every one of the steps or for all of them. The yields obtained are excellent. Thus, for example, in the manufacture of ethyl acetate, it is possible easily to obtain yields from 90 to 96% with regard to ethylene, greater than 98% with regard to acetic acid, while monochloracetic acid consumption is lower than 3% of the weight of ethyl acetate formed.

The process according to the present invention will be better understood by reference to the attached drawing which shows a diagrammatic flow sheet of the process.

The apparatus comprises an autoclave A provided with an agitator in which sulfuric acid enters through the pipe 1 and olefin by the pipe 2. After the absorption reaction, the liquid passes through line 3, monochloracetic acid is added at 4, then the liquid mixture enters the reactor B provided with a distillation column, wherein the monochloracetate is formed and distills.

The reaction liquid coming from reactor B passes into flash vaporization apparatus C wherein the remaining monochloracetate and unreacted acid are separated, and escape through pipe 5, are condensed in 6 and are recycled to the reactor B of the pipe 7. Vaporization residue, which contains sulfuric acid, heavy products such as olefinic polymers, and a small ratio of monochloracetic acid, is partially recycled through pipe 8, to the absorption zone. The remaining portion is introduced at the same time as a quantity of olefinic absorbate passing through pipe 9, into flash vaporization apparatus D. The monochloracetate formed in D after condensation in 10, is recycled to the reactor B. The residue from D, which contains olefinic polymers, is removed.

The monochloracetate distilled from the reactor B passes through the pipe 11 and is recovered in the container 12. It may be freed of alcohols and ethers, as indicated hereinabove, in a system not shown on the drawing. It passes through pipe 13 to the reactor F, provided with a distillation column. The organic acid and the sulfuric acid as catalyst respectively enter this reactor via pipes 14 and 15. The final ester distils, and passes through pipe 16, is condensed and recovered into the collecting apparatus 16'.

The liquid remaining in the reactor F passes to a second reactor G, and then to a distillation column H in which the ester formed in G is separated. This ester passes through pipe 17 to the collecting apparatus 16'.

The residue from column H passes to another distillation column I wherein the unreacted monochloracetate and the excess of organic acid are separated and pass out at the top through pipe 18 to the reactor F. At the bottom of the column I sulfuric acid and the monochloracetic acid produced in the acidolysis reaction are removed and are entirely recycled through pipe 19, to the reactor B.

The apparatus is provided with systems $E_1$, $E_2$ and $E_3$ filled with caustic soda solution, which are used to absorb the small amount of sulfurous anhydride formed by degradation.

The following example describes in a non-limitative way, how the process according to the present invention may be applied.

EXAMPLE

Manufacture of ethyl acetate from ethylene and acetic acid.

(a) Operating conditions and reagents used

In the absorption step there was initially used a sulfuric acid titrating 98–99%. The temperature in the autoclave A was 70° C., ethylene pressure 30 bars, contact time for each absorption from 45 to 50 minutes. The ethylene used had a purity greater than 99%.

In the step of manufacturing ethyl monochloracetate there was initially used monochloracetic acid having a purity of 99.8%, in a ratio corresponding to 2.5 moles of acid per mole of absorbed ethylene. In the reactor B the temperature was 108–110° C., pressure 20 mm. Hg, reagent contact time, 35 minutes. In the vaporizer C, temperature was 148–152° C., while in D, it reached 170–180° C.; the pressure in the vaporizers was 8 to 10 mm. Hg.

In the initial step of ethyl acetate manufacturing, the acetic acid titrated 99.8% and was used in a ratio corresponding to 1.8 moles of acid per mole of monochloracetate and a quantity of sulfuric acid equal to 0.18 mole per mole of this ester.

In the reactor F, the temperature was 141–145° C., contact time 50 to 55 minutes. Reactor G was operated at 125–130° C. with a mean contact time of 45 minutes. The two reactors operated at atmospheric pressure. In distillation column H, the temperature in the boiler was 120–130° C., pressure 300 mm. Hg, contact time in the boiler, 30 minutes. In the column I there was a temperature in the boiler of 131–135° C., a pressure of 60–70 mm. Hg, a contact time in the boiler slightly less than 15 minutes.

(b) Operation and results

First, absorption was conducted in a discontinuous manner. Then in the following steps operation was conducted in a continuous manner. To accomplish this the different parts of the device have been successively made to function, recycling circuits have progressively been established and the operation has been continued until stable conditions were established. At this time the whole system worked in a continuous way, and the different reactors were fed by recycling.

At equilibrium, for 54.4 moles of absorbed ethylene, 1.25 moles of monochloracetic acid introduced to compensate losses, 51.2 moles of acetic acid, 1105 gr. of sulfuric acid and 40 gr. of acetic anhydride as a dehydrating agent, there was collected in the collecting device 16', a raw ester containing 50.20 moles of ethyl acetate and 0.75 mole of acetic acid. The alcohol content of the acetate was 450 parts per million. A residue, mainly comprising sulfuric acid and polymers, was drawn off from D.

What is claimed is:

1. In a process of manufacturing aliphatic acid esters by reacting an olefin with monochloracetic acid in the presence of sulfuric acid whereby a monochloracetic acid ester is formed, and subjecting said monochloracetic acid ester to treatment with an aliphatic acid whereby an ester of said aliphatic acid is formed and monochloracetic acid is regenerated, the improvement which consists in:

(1) absorbing a gaseous olefinic hydrocarbon having 2 to 4 carbon atoms in sulfuric acid having a concentration of at least 98% under 5 to 50 bars at 40–120° C.;

(2) reacting the absorbate with monochloracetic acid in excess of the stoichiometry and separating the resultant alkyl monochloracetate from the reaction mixture under reduced pressure;

(3) vaporizing the residual liquid from the monochloracetate formation step in order to remove at least part of the unreacted monochloracetic acid, condensing the vaporisate and recycling it to said monochloracetate formation step;

(4) submitting said alkyl monochloracetate to an acidolysis step by reacting it with an excess of an alkanoic acid having the formula R—COOH, in which R is an alkyl radical of from 1 to 3 carbon atoms, at 125–155° C., under atmospheric pressure in the presence of sulfuric acid, and separating the final ester by distillation; and (5) distilling the residual liquid from said acidolysis step whereby unreacted aliphatic acid is removed and is recycled to said acidolysis step and the tailings thereof are recycled to the monochloracetate formation step.

2. A process in accordance with claim 1 wherein the alkanoic acid ester is ethyl acetate, the olefin is ethylene and the carboxylic acid is acetic acid.

3. A process in accordance with claim 1 wherein 1.05 to 3 moles monochloracetic acid is provided in step (2) for each mole of olefin.

4. A process in accordance with claim 1 wherein said reduced pressure in step (2) is 10 to 40 mm. Hg.

5. A process in accordance with claim 1 wherein the molar ratio of alkanoic acid to alkyl monochloracetate in step (4) is between 1.1 and 3.5.

6. A process in accordance with claim 1 wherein the reaction mixture in step (4) contains 500 to 1,000 parts per million water.

7. A process in accordance with claim 1 wherein a major portion of the residue from vaporization of step (3) is recycled to the absorption step and the non-recycled portion is brought together with a portion of olefinic absorbate from said absorption step so as to recover the remaining unreacted monochloracetic acid as an ester.

References Cited

UNITED STATES PATENTS

| 1,882,808 | 10/1932 | Graves | 260—491 |
| 1,915,308 | 6/1933 | Graves | 260—497 |
| 1,939,384 | 12/1933 | Buc | 260—487 |

FOREIGN PATENTS

| 1,332,186 | 6/1963 | France | 260—486 |

LORRAINE A. WEINBERGER, Primary Examiner

V. GARNER, Assistant Examiner

U.S. Cl. X.R.

260—487

UNITED STATES PATENT OFFICE
CERTIFICATE OF CORRECTION

Patent No. 3,555,078                     Dated January 12, 1971

Inventor(s) Louis AMIET ET AL.

It is certified that error appears in the above-identified patent and that said Letters Patent are hereby corrected as shown below:

Column 2, line 13, "sulfric" should be --sulfuric--.

Column 3, line 51, "generaly" should be --generally--.

Column 6, line 26, "aliphatic" should be --alkanoic--.

Signed and sealed this 4th day of May 1971.

(SEAL)
Attest:

EDWARD M. FLETCHER, JR.            WILLIAM E. SCHUYLER, JR.
Attesting Officer                  Commissioner of Patents